United States Patent [19]
Cullen

[11] Patent Number: 5,906,418
[45] Date of Patent: May 25, 1999

[54] AUXILIARY TRACTION WHEEL FOR A VEHICLE

[76] Inventor: Steven R. Cullen, Box 747, Astoria, Oreg. 97103

[21] Appl. No.: 08/886,671

[22] Filed: Jul. 1, 1997

[51] Int. Cl.$^6$ .................................................... B60B 11/00
[52] U.S. Cl. ........................................ 301/36.1; 301/35.62
[58] Field of Search ................................ 301/35.62, 36.1, 301/111, 114, 13.1, 13.2

[56] References Cited

U.S. PATENT DOCUMENTS

| | | | |
|---|---|---|---|
| 2,416,862 | 3/1947 | Baker | 301/36.1 X |
| 3,237,992 | 3/1966 | Kiesau | 301/36.1 |
| 3,532,384 | 10/1970 | Williams, Jr. | 301/36.1 |
| 4,261,621 | 4/1981 | Fox | 301/35.62 X |

*Primary Examiner*—Russell D. Stormer
*Attorney, Agent, or Firm*—Zarley, McKee, Thomte Voorhees & Sease; Dennis L. Thomte

[57] ABSTRACT

An auxiliary traction wheel is provided so that a dual wheel arrangement may be changed to a three-wheel assembly. A modified wheel is described as are attachment studs which are used to secure the wheels together.

15 Claims, 3 Drawing Sheets

AUXILIARY TRACTION WHEEL FOR A VEHICLE

BACKGROUND OF THE INVENTION

1. Field of the Invention

This invention relates to an auxiliary wheel assembly for a vehicle and more particularly to an auxiliary traction wheel assembly for a vehicle.

2. Description of the Related Art

A large number of trucks employ a pair of dual wheels at the rearward end thereof. Each of the dual wheels includes an inner wheel having a hub portion including a plurality of spaced-apart openings formed therein which receive the lug bolts extending from a brake drum or the like. An outer wheel is positioned outwardly of the inner wheel and it also has a central hub portion provided with a plurality of openings which also receive the stud bolts extending therethrough. Lug nuts are threadably mounted on the lug bolts and secure both the inner and outer wheels to the brake drum for rotation therewith. Although the conventional dual wheels of the truck perform generally satisfactorily, it is sometimes desirable to provide additional flotation or traction to the dual wheels in extremely muddy or sandy conditions. Further, some smaller trucks only employ a single wheel at the opposite ends of the driven axle shaft and there are many times when those single wheels do not provide sufficient traction or flotation for the truck.

SUMMARY OF THE INVENTION

An auxiliary traction wheel assembly is provided for a vehicle to improve the traction or flotation thereof. The auxiliary wheel assembly of this invention may be used to add an additional wheel to a dual wheel arrangement or may be utilized to add an additional wheel to a single wheel arrangement. When it is desired to add an additional or auxiliary traction wheel to a dual wheel assembly, the outer dual wheel is first removed. A slightly modified wheel is then positioned outwardly of the inner wheel in place of the conventional outer dual wheel which has been temporarily removed. The modified wheel assembly includes a support plate welded thereto which has a plurality of openings formed therein which register or which are aligned with the lug bolts. An attachment stud is inserted through each of the openings in the support plate. Each of the attachment studs has an internally threaded portion at its inner end which is threadably mounted on the lug bolts. The outer ends of the attachment stubs are positioned outwardly of the support plate on the modified wheel and have externally threaded portions at the outer end thereof. The outer dual wheel which was previously removed is then mounted on the outer ends of the attachment studs and secured thereto by the standard lug nuts. Thus, in the assembled arrangement, three wheels are provided rather than the conventional dual wheels. In those situations where the device is to be used in connection with a truck having a single wheel rather than a dual wheel, the truck wheel is removed and the modified wheel is positioned adjacent the outer end of the brake drum. The wheel which has been removed from the truck is then secured to the outer end of the modified wheel so that the truck is provided with dual wheels rather than a single wheel. The addition of the auxiliary wheel increases the flotation and traction of the truck.

Therefore, it is a principal object of the invention to provide an auxiliary traction wheel assembly for a vehicle.

Still another object of the invention is to provide an auxiliary traction wheel assembly for a vehicle having dual wheels or single wheels.

Still another object of the invention is to provide an auxiliary traction wheel assembly which may be used without extensive modification.

Still another object of the invention is to provide an auxiliary traction wheel assembly for a vehicle to provide increased flotation and/or traction for the vehicle.

Still another object of the invention is to provide an auxiliary traction wheel assembly for a vehicle including unique means for securely fastening the traction wheel assembly to the vehicle.

These and other objects will be apparent to those skilled in the art.

DESCRIPTION OF THE PREFERRED EMBODIMENT

Figure 1:
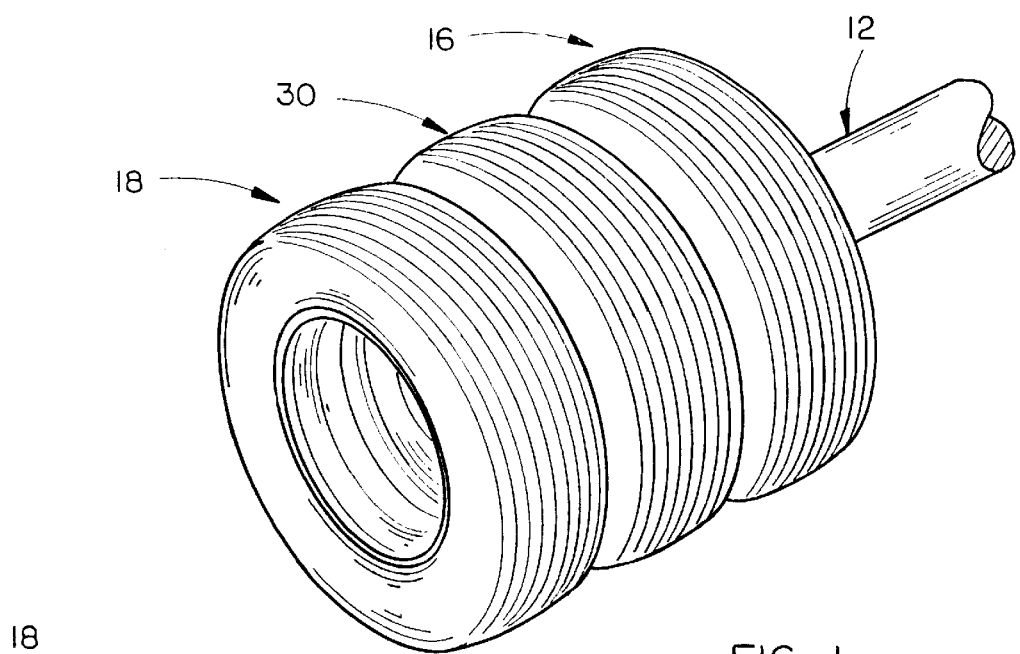
FIG. 1 is a perspective view of the auxiliary traction wheel assembly of this invention.
Figure 2:
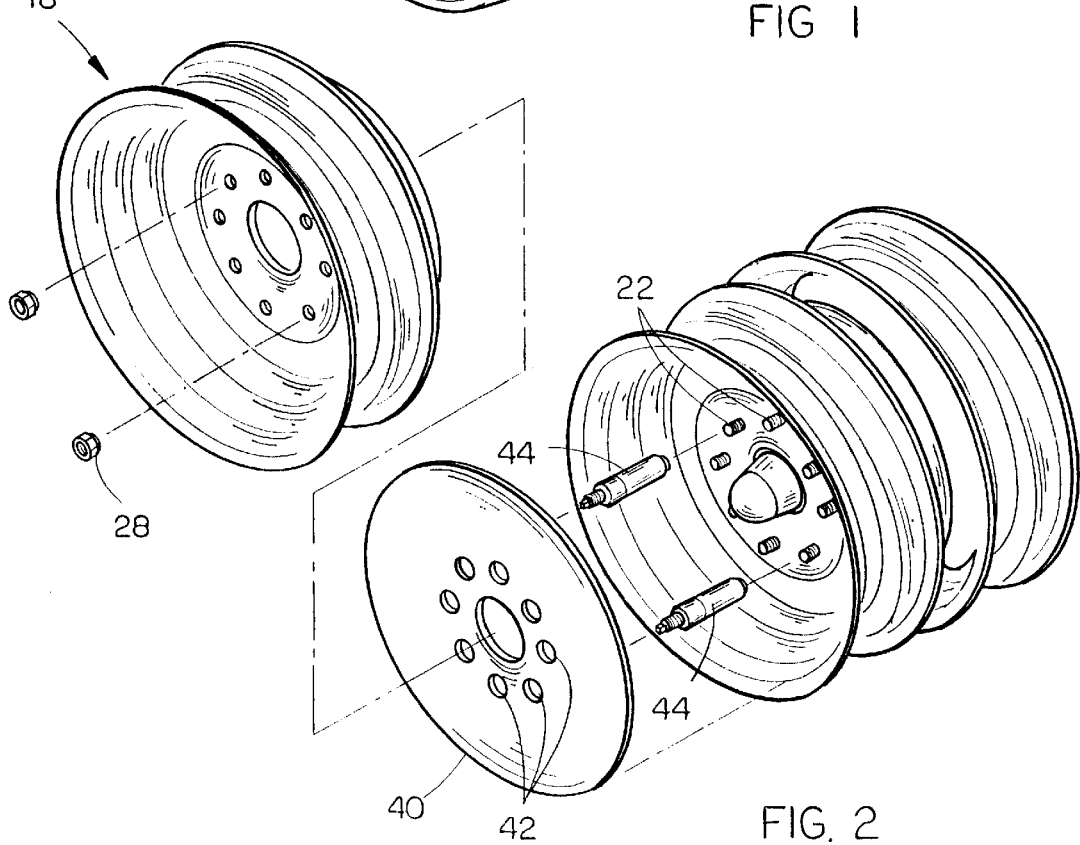
FIG. 2 is an exploded perspective view of the assembly of FIG. 1 with the tires having been removed therefrom.
Figure 3:
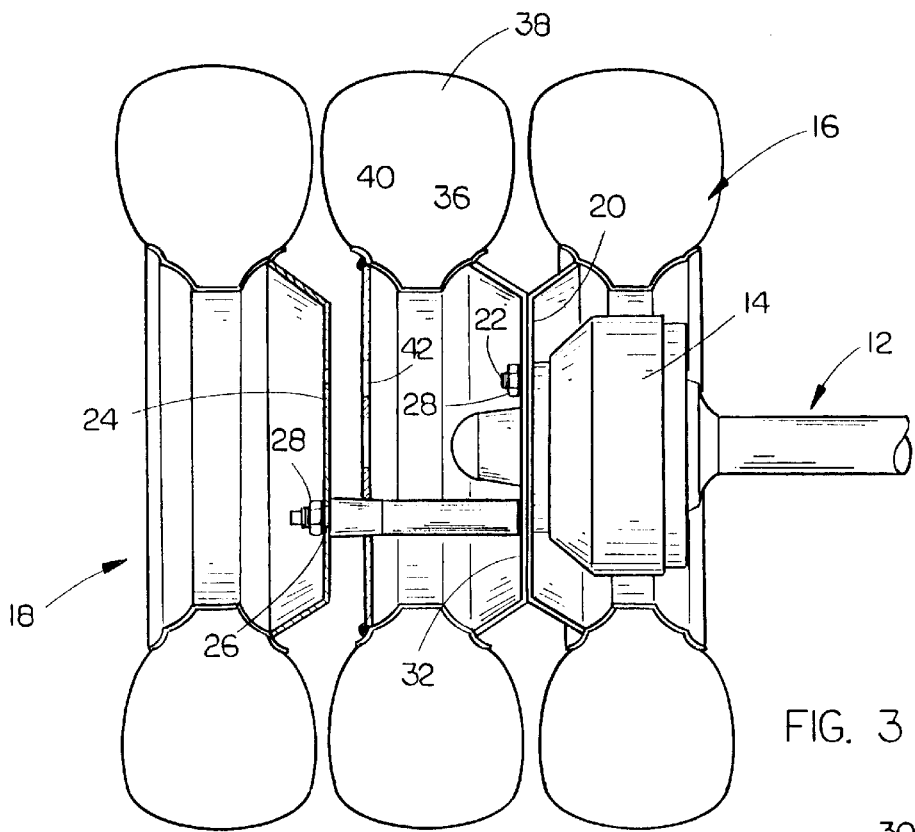
FIG. 3 is a sectional view of the assembly of FIG. 1.

The numeral 12 refers generally to a conventional truck axle shaft adapted to have a pair of dual wheels mounted thereon at the opposite ends thereof. Normally, the axle shaft 12 of the truck is connected to brake drums 14 mounted at the opposite ends thereof for rotation therewith. Normally, the dual wheels include an inner wheel 16 and an outer wheel 18. It should be noted that the drawings illustrate the inner wheel 16 and outer wheel 18 after the auxiliary wheel has been included in the assembly. Normally, outer wheel 18 is positioned adjacent inner wheel 16. Conventionally, the inner wheel 16 is positioned as illustrated in FIG. 3 so that the central hub 20 thereof is positioned adjacent the outer surface of the brake drum 14. Brake drum 14 includes a plurality of lug bolts 22 extending outwardly therefrom which extend through openings formed in hub portion 20. Outer wheel 18 also includes a hub portion 24 having a plurality of openings 26 formed therein adapted to receive the lug bolts 22. The inner and outer wheels 16 and 18 are normally secured to the lug bolts 22 by lug nuts 28.

When it is desired to provide increased flotation or traction to the wheels of the truck, lug nuts 28 are first removed to permit the outer wheel 18 to be removed from the lug bolts. An auxiliary wheel 30 is provided which includes a hub portion 32 having a plurality of openings 34 formed therein which are adapted to receive lug bolts 22. Wheel 30 also includes a conventional rim 36 upon which tire 38 is mounted. Wheel 30 is conventional in design except for the support plate 40 which is welded to the wheel in the manner illustrated in the drawings so as to be spaced outwardly of hub portion 32. Support plate 40 has a plurality of openings 42 formed therein for alignment with the lug bolts 22.

Figure 4:
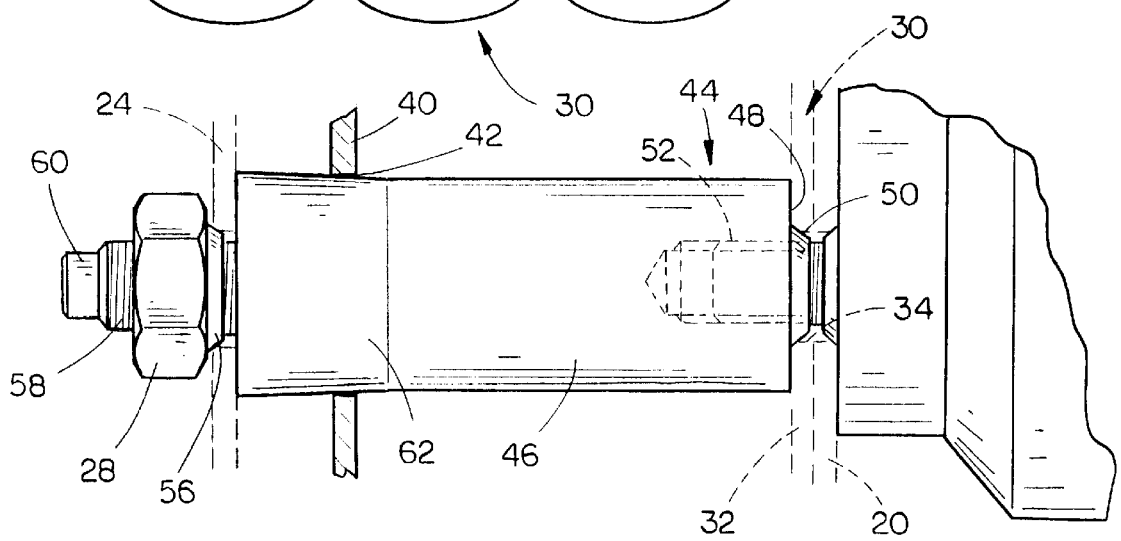
FIG. 4 is a partial sectional view illustrating the attachment studs secured to the lug bolts.
Figure 5A:
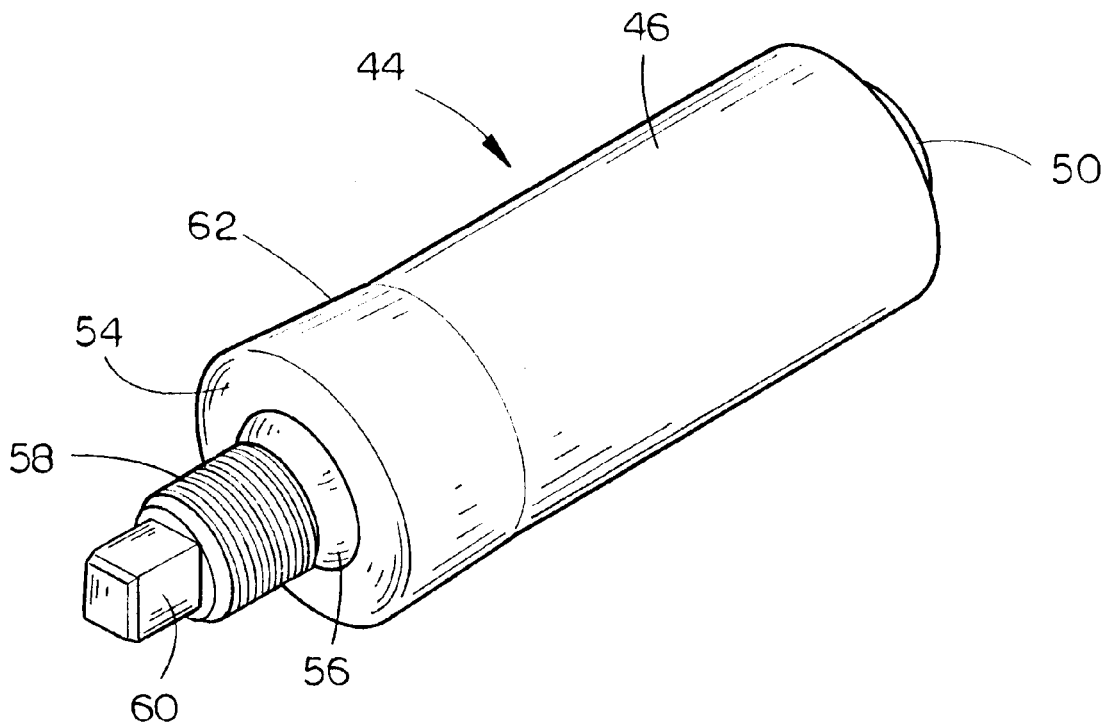
FIG. 5A is a perspective view of one of the attachment studs.
Figure 5B:
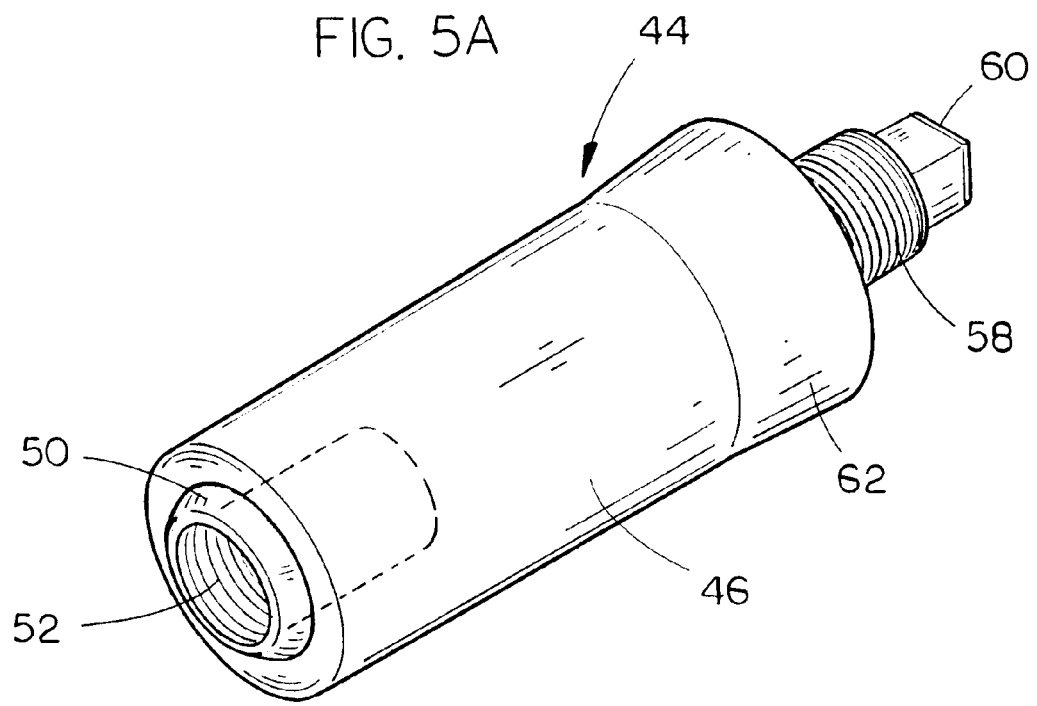
FIG. 5B is a perspective view of one of the attachment studs.

A plurality of attachment studs 44 are provided to connect the assembly together as will now be described in detail. Attachment stud 44 includes a body portion 46, as seen in the drawings. The inner end 48 of attachment stud 44 is provided with a tapered portion 50, as illustrated in FIG. 4. Stud 44 is also provided with an internally threaded portion 52 which extends inwardly into the stud from the inner end thereof. The outer end 54 of stud 44 is provided with a tapered portion 56 and is also provided with an externally threaded portion 58 which is positioned outwardly thereof. A wrench receiving means 60 is provided outwardly of threaded portion 54 and is adapted to receive a wrench so that the stud may be tightened or loosened with respect to the lug bolts 22.

Thus, when it is desired to increase the flotation or traction of the truck, the outer dual wheel 18 is first removed, as previously described. The auxiliary wheel 30 is then positioned outwardly of inner wheel 16 so that the lug bolts 22 extend through the openings 34 in hub portion 32. The attachment studs 44 are then inserted through the openings 42 in support plate 40 and are threadably secured to the lug bolts 22 and securely tightened thereon by means of a wrench on the wrench receiving means 60. Body portion 48 is provided with a tapered portion 62, as illustrated in the drawings, so that the body portion 46 tightly engages or is received by the openings 42 to securely position the wheel 30. The outer wheel 18 which had been previously removed from the dual wheel arrangement is then positioned with respect to the wheel 30 so that the openings in hub portion 20 are received by the externally threaded portions 58. The lug nuts 28 are then threadably mounted on the threaded portions 58 of the attachment studs 44 to securely mount the three wheels in position, as seen in FIG. 3, thereby providing an additional wheel for increased traction and/or flotation. The tapered portions 50 on the studs 44 are provided so that they are partially received within the openings 34 formed in the hub portion 32 of the wheel 30. The tapered portion 56 on the attachment studs 44 is provided so that the lug nuts 28 will securely engage the attachment studs 44.

In those situations where a truck has only a single wheel at the opposite ends of the axle shaft, rather than dual wheels, the wheel of the truck is removed by removing the lug nuts therefrom. The auxiliary wheel 30 is then positioned on the brake drum in place of the conventional wheel. The conventional drive wheel is then positioned outwardly of the auxiliary wheel 30, as in the dual wheel arrangement, so that an additional wheel is provided to increase the traction and/or flotation of the drive wheel assembly.

Thus it can be seen that the invention accomplishes at least all of its stated objectives.

I claim:

1. In combination:
   a vehicle including a driven axle shaft having an outer end, a drum means mounted on the outer end of said axle shaft for rotation therewith, said drum having a plurality of spaced-apart lug bolts extending outwardly therefrom;
   a first wheel mounted on said drum means for rotation therewith;
   said first wheel including a central hub portion, a tire supporting rim, and a tire mounted on said rim;
   said hub portion of said first wheel having a plurality of openings formed therein which receive said lug bolts extending therethrough;
   said first wheel having inner and outer ends;
   a disc-shaped support plate secured to said first wheel at the outer end thereof which at least partially covers the outer end of said hub portion of said first wheel;
   said support plate having a plurality of openings formed therein which are aligned with said openings in said hub portion;
   an attachment stud, having inner and outer ends, extending through each of said openings in said support plate;
   the inner end of each of said attachment studs having internal threads formed therein for threadable connection to one of said lug bolts;
   the outer ends of said attachment studs being positioned outwardly of said support plate and having external threads formed thereon;
   wrench receiving means on said attachment studs for receiving a wrench to enable said attachment studs to be threadably tightened on said lug bolts and to be threadably loosened therefrom;
   a second wheel including a central hub portion, a tire supporting rim, and a tire mounted on said rim;
   said second wheel having inner and outer ends;
   said hub portion of said second wheel having a plurality of openings formed therein which receive said attachment studs extending therethrough so that said external threads on said outer ends of said attachment studs are positioned outwardly of the outer end of said central hub portion of said second wheel;
   and lug nuts threadably mounted on said external threads of said outer end of said attachment studs for securing said second wheel to said attachment studs.

2. The combination of claim 1 wherein the inner ends of each of said attachment studs has a tapered portion formed thereon which is at least partially received by said openings in said hub portion of said first wheel.

3. The combination of claim 1 wherein each of said attachment studs has a tapered portion formed inwardly of said external threads thereof which engages the openings formed in said support plate.

4. The combination of claim 1 wherein each of said attachment studs has a tapered portion formed therein inwardly of said external threads thereon for engagement with said lug nuts.

5. The combination of claim 1 wherein said wrench receiving means on each of said attachment studs is positioned on the outer end thereof.

6. In combination with a vehicle including a driven axle shaft having an outer end, a drum means mounted on the outer end of said axle shaft for rotation therewith, said drum having a plurality of spaced-apart lug bolts extending outwardly therefrom, comprising:
   a first wheel mounted on said drum means for rotation therewith;
   said first wheel including a central hub portion, a tire supporting rim, and a tire mounted on said rim;
   said hub portion of said first wheel having a plurality of openings formed therein which receive said lug bolts extending therethrough;
   said first wheel having inner and outer ends;
   a disc-shaped support plate secured to said first wheel at the outer end thereof which at least partially covers the outer end of said hub portion of said first wheel;
   said support plate having a plurality of openings formed therein which are aligned with said openings in said hub portion;
   an attachment stud, having inner and outer ends, extending through each of said openings in said support plate;
   the inner end of each of said attachment studs having internal threads formed therein for threadable connection to one of said lug bolts;
   the outer ends of said attachment studs being positioned outwardly of said support plate and having external threads formed thereon;

wrench receiving means on said attachment studs for receiving a wrench to enable said attachment studs to be threadably tightened on said lug bolts and to be threadably loosened therefrom;

a second wheel including a central hub portion, a tire supporting rim, and a tire mounted on said rim;

said second wheel having inner and outer ends;

said hub portion of said second wheel having a plurality of openings formed therein which receive said attachment studs extending therethrough so that said external threads on said outer ends of said attachment studs are positioned outwardly of the outer end of said central hub portion of said second wheel;

and lug nuts threadably mounted on said external threads of said outer end of said attachment studs for securing said second wheel to said attachment studs.

7. The combination of claim 6 wherein the inner ends of each of said attachment studs has a tapered portion formed thereon which is at least partially received by said openings in said hub portion of said first wheel.

8. The combination of claim 6 wherein each of said attachment studs has a tapered portion formed inwardly of said external threads thereof which engages the openings formed in said support plate.

9. The combination of claim 6 wherein each of said attachment studs has a tapered portion formed therein inwardly of said external threads thereon for engagement with said lug nuts.

10. The combination of claim 6 wherein said wrench receiving means on each of said attachment studs is positioned on the outer end thereof.

11. In combination:
a vehicle including a driven axle shaft having an outer end, a drum means mounted on the outer end of said axle shaft for rotation therewith, said drum having a plurality of spaced-apart lug bolts extending outwardly therefrom;

a first wheel mounted on said drum means for rotation therewith;

said first wheel including a central hub portion, a tire supporting rim, and a tire mounted on said rim;

said hub portion of said first wheel having a plurality of openings formed therein which receive said lug bolts extending therethrough;

said first wheel having inner and outer ends;

a second wheel positioned outwardly of said first wheel for rotation therewith;

said second wheel including a central hub portion, a tire supporting rim, and a tire mounted on said rim;

said hub portion of said second wheel having a plurality of openings formed therein which receive said lug bolts extending therethrough;

said second wheel having inner and outer ends;

a disc-shaped support plate secured to said second wheel at the outer end thereof which at least partially covers the outer end of said hub portion of said second wheel;

said support plate having a plurality of openings formed therein which are aligned with said openings in said hub portion;

an attachment stud, having inner and outer ends, extending through each of said openings in said support plate;

the inner end of each of said attachment studs having internal threads formed therein for threadable connection to one of said lug bolts;

the outer ends of said attachment studs being positioned outwardly of said support plate and having external threads formed thereon;

wrench receiving means on said attachment studs for receiving a wrench to enable said attachment studs to be threadably tightened on said lug bolts and to be threadably loosened therefrom;

a third wheel including a central hub portion, a tire supporting rim, and a tire mounted on said rim;

said third wheel having inner and outer ends;

said hub portion of said third wheel having a plurality of openings formed therein which receive said attachment studs extending therethrough so that said external threads on said outer ends of said attachment studs are positioned outwardly of the outer end of said central hub portion of said third wheel;

and lug nuts threadably mounted on said external threads of said outer end of said attachment studs for securing said third wheel to said attachment studs and to secure said first and second wheels to said lug bolts.

12. The combination of claim 11 wherein the inner ends of each of said attachment studs has a tapered portion formed thereon which is at least partially received by said openings in said hub portion of said second wheel.

13. The combination of claim 11 wherein each of said attachment studs has a tapered portion formed inwardly of said external threads thereof which engages the openings formed in said support plate.

14. The combination of claim 11 wherein each of said attachment studs has a tapered portion formed therein inwardly of said external threads thereon for engagement with said lug nuts.

15. The combination of claim 11 wherein said wrench receiving means on each of said attachment studs is positioned on the outer end thereof.

* * * * *